United States Patent [19]

Johnson

[11] Patent Number: 4,968,126

[45] Date of Patent: Nov. 6, 1990

[54] ALL-OPTICAL DEVICE AND METHOD FOR REMAPPING IMAGES

[75] Inventor: John L. Johnson, Huntsville, Ala.

[73] Assignee: The United States of America as represented by the secretary of the Army, Washington, D.C.

[21] Appl. No.: 481,922

[22] Filed: Feb. 20, 1990

[51] Int. Cl.[5] .............. G02B 5/10

[52] U.S. Cl. .............. 350/620; 350/505; 350/619; 350/622

[58] Field of Search .............. 350/504, 505, 602, 608, 350/619, 620, 622

[56] References Cited

U.S. PATENT DOCUMENTS

| | | | |
|---|---|---|---|
| 3,790,257 | 2/1974 | Goldstein et al. | 350/620 |
| 3,802,767 | 4/1974 | Rambauske | 350/620 |
| 3,817,605 | 6/1974 | Franklin et al. | 350/620 |
| 3,827,059 | 7/1974 | Rambauske | 350/620 |
| 3,982,824 | 9/1976 | Rambauske | 350/620 |
| 4,886,348 | 12/1989 | Schmertz | 350/618 |

*Primary Examiner*—Bruce Y. Arnold
*Assistant Examiner*—J.P. Ryan
*Attorney, Agent, or Firm*—Freddie M. Bush; Hay Kyung Chang

[57] ABSTRACT

An all-optical polar transform device transforms an image in rectangular coordinates into an image in polar coordinates by reflecting an input image-containing beam from a series of suitably positioned reflective surfaces and finally transmits the beam out as an output beam containing the transformed image.

27 Claims, 4 Drawing Sheets

ALL-OPTICAL DEVICE AND METHOD FOR REMAPPING IMAGES

DEDICATORY CLAUSE

The invention described herein may be manufactured, used, and licensed by or for the Government for qovernmental purposes without the payment to me of any royalties thereon.

BACKGROUND OF THE INVENTION

An optical image can be described by its intensity distribution on the image plane. It is usually written as a function of the horizontal X-coordinate and the vertical y-coordinate. However, it can also be described by the radial distance, R, from the origin and the corresponding angle, $\theta$, between the radius line and the horizontal x-axis. These two sets of parameters are the rectangular coordinates x, y and the polar coordinates R, $\theta$, respectively, as shown in FIG. 1. In image analysis and many image processing systems, it is frequently desired to produce a remapped image. For example, in converting an image from the rectangular to polar coordinate system, the remapped image is laid out on a rectangular coordinate system U, V, with U equal to R and V a function of $\theta$ in the original image. Thus, for example, a circle in the polar coordinate system as shown in FIG. 2A would be remapped into a vertical line in the U, V image, as shown in FIG. 2B. Mathematically, this remapping transform is described $$U = \sqrt{X^2 + y^2}$$

and $$V = \text{Arctan}\left(\frac{Y}{X}\right)$$

However, due to the amount of calculation required for each point, such remapping in the past had to be done by a computer, if the remapping was to be done with any reasonable speed. Thus, either a specially built video processor which transforms digitized images in real-time or a computer with a frame grabber that processes one image frame at a time in nonreal-time was required.

SUMMARY OF THE INVENTION

An all-optical polar transform device directs the path of an input beam via a series of suitably positioned reflective surfaces and finally through a beam splitter to accomplish remapping of images from rectangular to polar coordinates.

DESCRIPTION OF THE PREFERRED EMBODIMENT

Figure 1:
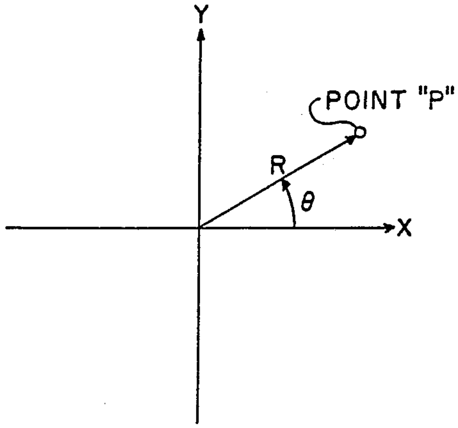
FIG. 1 shows the rectangular and polar coordinates of the position of point P.
Figure 2A:
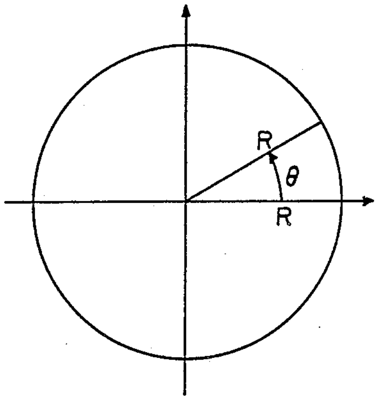
FIG. 2A shows a circle in polar coordinates.
Figure 2B:
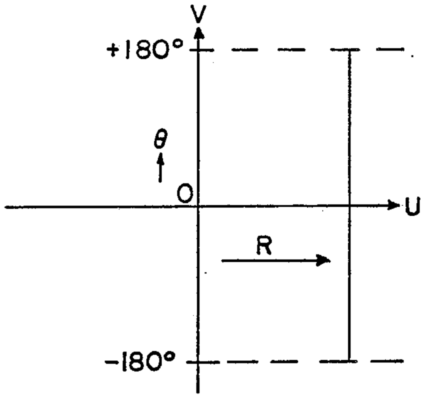
FIG. 2B depicts the results of the transformation of a circle from rectangular coordinates to polar coordinates.
Figure 3:
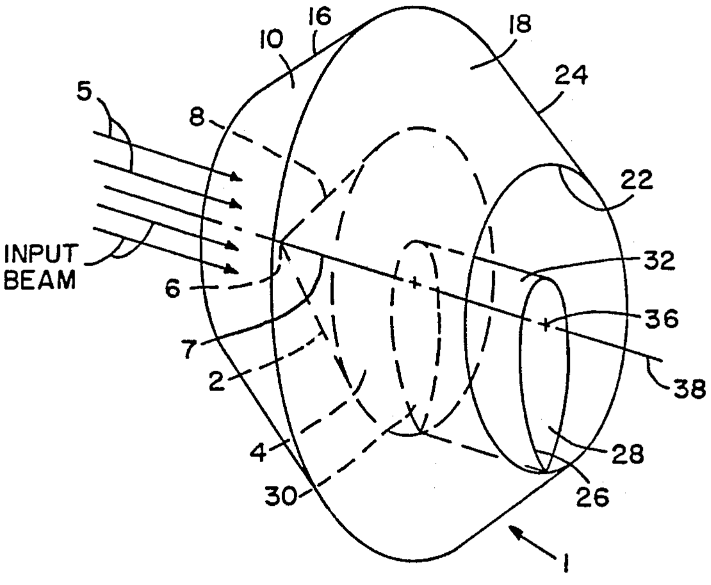
FIG. 3 is a diagram of a preferred embodiment of applicant's invention to transform images in rectangular coordinates to images in polar coordinates.
Figure 4:
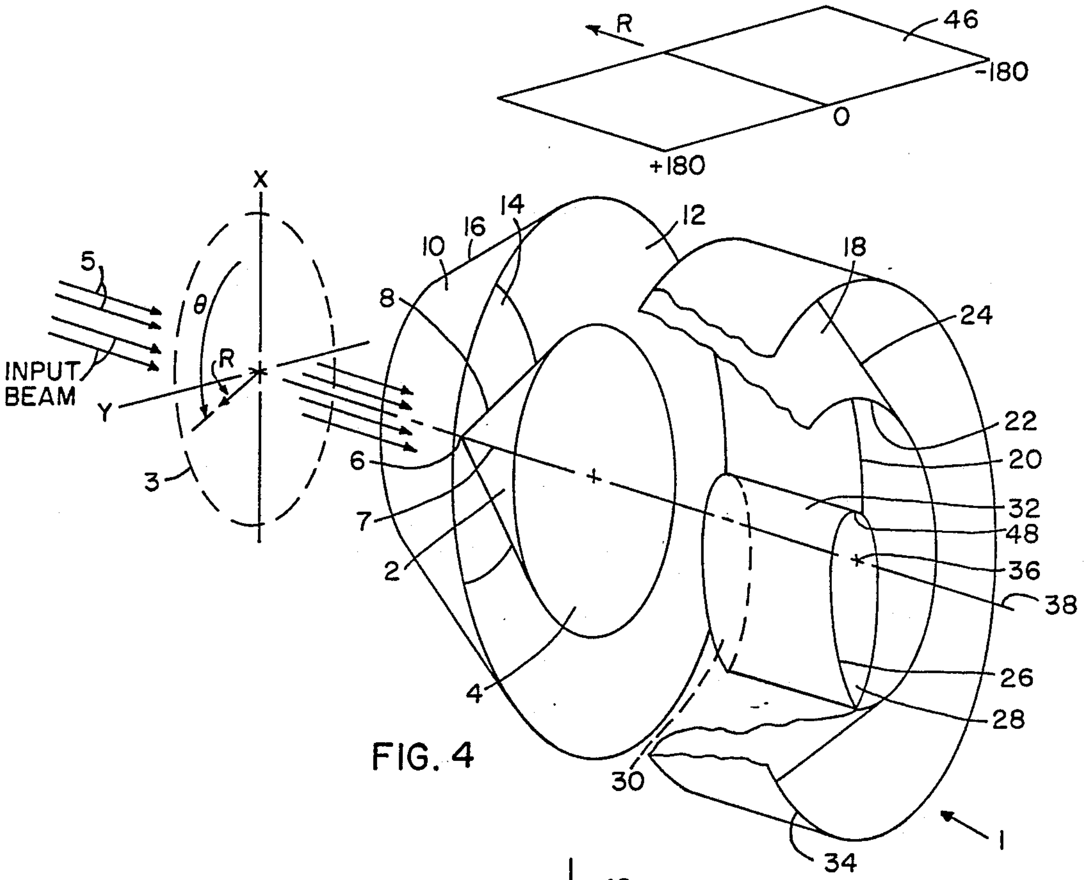
FIG. 4 shows an exploded view of a preferred embodiment of applicant's invention.

Referring now to the drawings wherein like numbers refer to like parts, FIGS. 1 and 2 are discussed in Background Of The Invention. FIG. 3 shows a preferred embodiment of applicant's invention, an exploded view of which is shown in FIG. 4. The structure and operation of polar transform device 1 is explained herein based on the assumption that light travels from left to right which assumption is made merely for convenience of explanation.

Figure 5A:
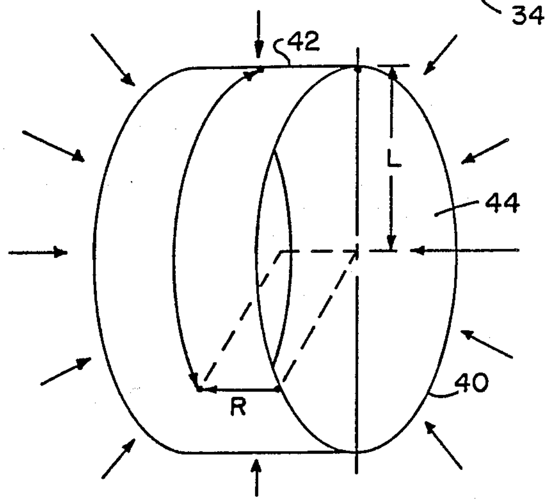
FIG. 5A shows an imaginary viewing screen which is used to facilitate the description of workings of applicant's invention.
Figure 5B:
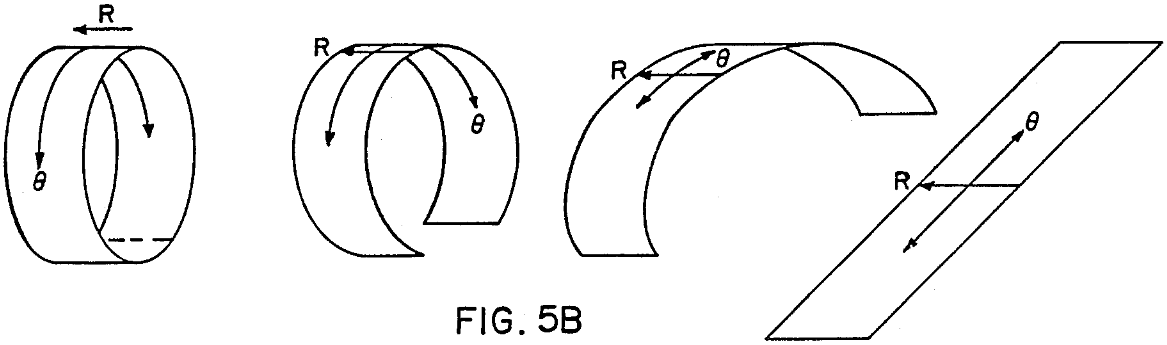
FIG. 5B is a sequential depiction of transformation of an image in rectangular coordinates to an image in polar coordinates using the imaginary viewing screen.

A beam of collimated light 5 is incident on a spatial light modulator (SLM) or an image transparency 3 in the input plane and is transmitted through it. The input image is typically about 1 inch in diameter. The beam, now modulated by the image pattern, then impinges on reflective outer surface 8 of conical reflector 2. Reflector 2 is a right circular cone whose axis 7 is aligned with the center of the collimated input beam and apex 6 faces the input beam. Thence, the beam reflects outward to reflective inner surface 16 of first frustum 10 of a right circular cone. First frustum 10 encompasses conical reflector 2 and shares common axis 7 with the reflector. Inner surface 16 of the first frustum and outer surface 8 of conical reflector are parallel to each other and apex 6 of conical reflector 2 and top 14 of first frustum are coplanar. The diameter of base 4 of conical reflector 2 is at least as long as the diameter of top 14 of the first frustum to ensure that all of the input beam is reflected off of reflective outer surface 8 of the conical reflector, and the diameter of conical base 4 should be one half of the length of the diameter of base 12 of the first frustum 10 for maximum performance of polar transform device I. When the beam of light impinges on inner surface 16 of the first frustum, it is therefrom reflected toward beam splitter 24 of the second frustum 18 which is an exact geometric equal of first frustum 10. Base 20 of the second frustum faces base 12 of the first frustum to which it is suitably joined by means of any standard optical cement. Top 14 of the first frustum and top 22 of the second frustum face away from each other. Next, the beam is directed radially inward by beam splitter 24 toward system's axis 38 which extends along axis 7 of the conical reflector 2 and first frustum 10. At this juncture, it is profitable to consider an imaginary cylindrical viewing screen of radius, L, placed between beam splitter 24 of the second frustum and airfoil reflector 26. Airfoil reflector 26 has the cross sectional shape of an airfoil at a plane perpendicular to system axis 38, hence the name. System axis 38 passes through the center of curvature 36 of leading edge 48 of airfoil reflector 26. Such a viewing screen 44 is illustrated in FIG. 5A. On the screen, a point (X, Y) from the original image transparency 3 is now located at a distance R from the screen's edge 40 and at a position (L, $\theta$) around the circumference, where R is the radius on the viewing screen and $\theta$ is the angle measured from vertical point 42. If screen 44 could be cut and unrolled, then the image of the point would be in the desired R, $\theta$ coordinate as shown in FIG. 5B. Returning now to FIG. 4, reflector 26 performs the function of the imaginary viewing screen as explained immediately above.

With no such viewing screen in the actual operation of device 1, the beam proceeds from beam splitter 24 of second frustum 18 to reflector 26 which has reflective surface 32. Therefrom, it is reflected back toward beam splitter 24, but in a path of predetermined width to be transmitted out of device 1 as useful output beam. Reflector 26 extends through second frustum 18, with first teardrop-shaped end 28 and second teardrop-shaped end 30 on the planes of top 22 and base 20, respectively, of second frustum 18. Conical reflector 2 and airfoil reflector 26 may be suspended inside the hollow first frustum 10 and second frustum 18, respectively, by attaching a plate to top 22 of the second frustum and gluing first teardrop-shaped end 28 thereto and by gluing base 4 of conical reflector 2 to second teardrop-shaped end 30 of airfoil reflector 26.

Figure 6:
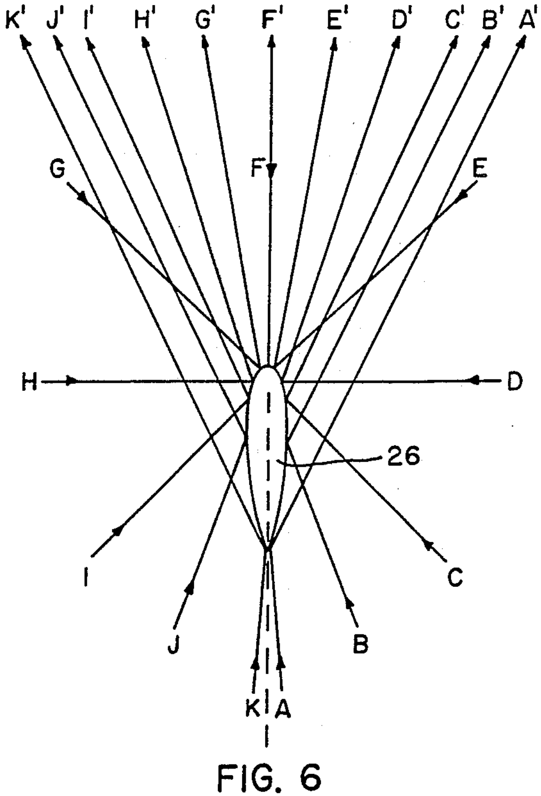
FIG. 6 gives a cross sectional view of airfoil reflector as well as the correspondence between incident rays and reflected rays.
Figure 7:
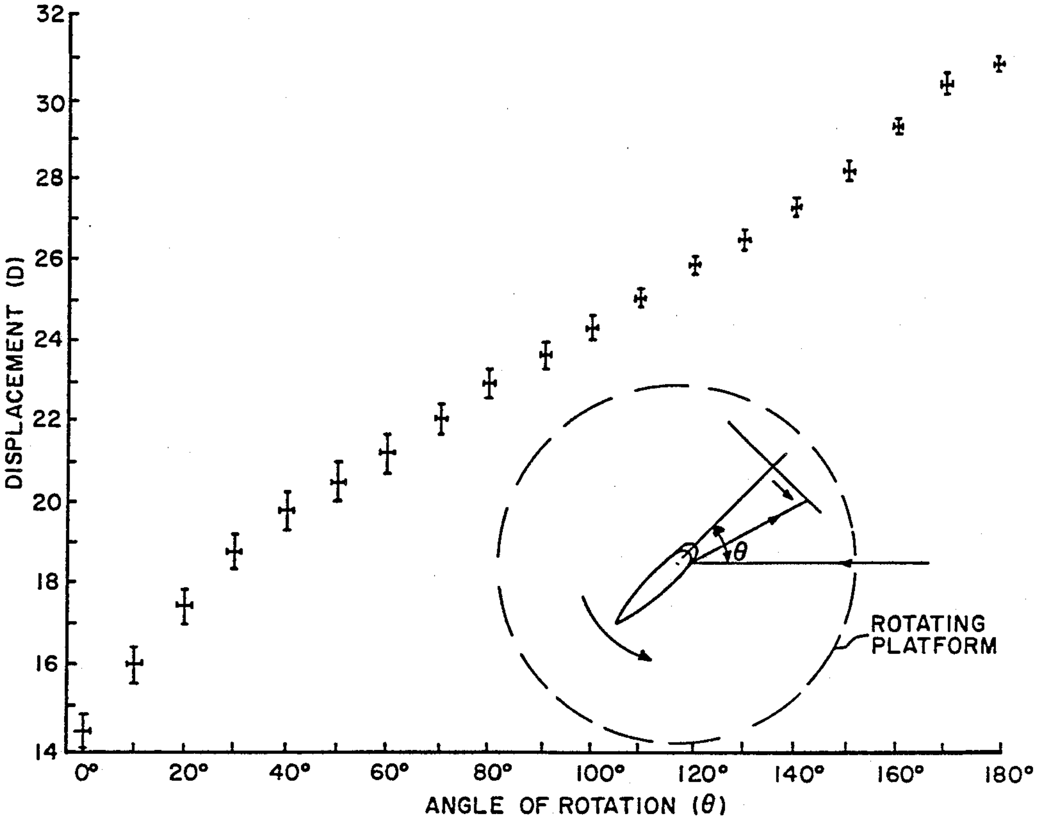
FIG. 7 is a graphic illustration of the feasibility of one-to-one correspondence between rays incident on airfoil reflector and the rays reflected therefrom.

The geometric configuration of reflector 26 is crucial for proper operation of device 1. As shown in FIG. 6, the reflector has a cross section similar in shape to that of an airfoil when cross sected at a plane perpendicular to the axis 38 of the entire system, hence the name given it by applicant, i.e. airfoil reflector. As can been seen in FIG. 6, the incident rays A, B, C, D, E, F, G, H, I, J and K impinge on reflector 26 and are reflected to the points $A^1$ through $K^1$, respectively. The rays' reflection pattern achieves the desired remapping of the coordinates. The linearity of the remapping depends on the exact shape and degree of the curvature of reflector 26. The crucial requirement is that the incident rays A through K be in one-to-one correspondence with reflected rays $A^1$ through $K^1$. The feasibility of such correspondence was demonstrated by an experimental test fixture. The test fixture was comprised of a reflective flexible plastic sheet mounted on a rotary stage and a fixed source of laser beam which shone the beam on the plastic sheet. As the stage was rotated, the relative displacement of the beam that was reflected from the plastic sheet was measured. The curvature of the flexible sheet was empirically varied until a monotonically increasing one-to-one relationship was obtained between the angle of rotation, $\theta$, and relative displacement, D. The result of this experiment is illustrated graphically in FIG. 7. While this particular surface shape obtained by simple empirical adjustments did not produce a completely linear remapping, it proved that remappings can be, in fact, achieved which give a one-to-one correspondence between the angle of rotation, $\theta$, and relative displacement, D. Surfaces which produce exact linear remappings could be obtained by numerical computer computations which generate the desired geometrical ray-trace input-output relationship.

Figure 8:
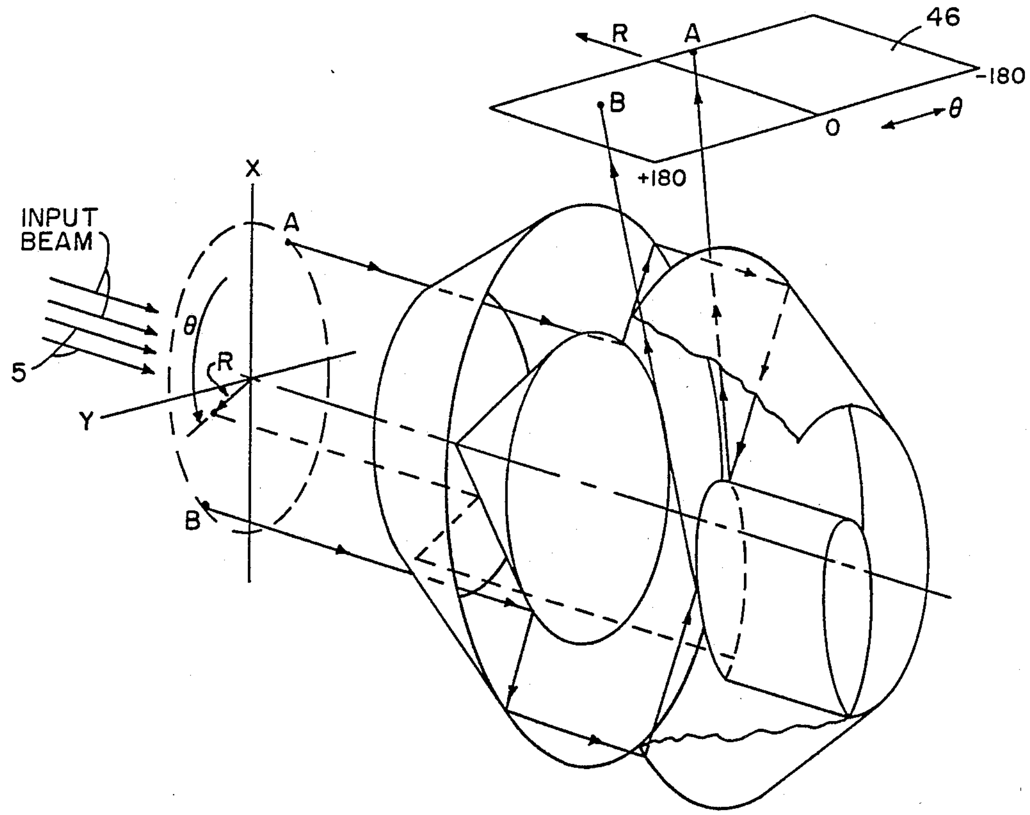
FIG. 8 shows the paths taken by randomly selected rays A and B through applicant's invention.

Returning now to FIG. 6, reflected rays $A^1$ through $K^1$ are transmitted out as useful output by beam splitter 24 of second frustum 18. FIG. 8 gives a visual depiction of the paths taken by randomly selected rays A and B of input beam 5 through the various above-described parts of transform device 1 until transmitted out of the device as useful output. As shown in FIG. 4, cylindrical surface 34 surrounding the second frustum acts as a cylindrical lens to help redirect the output beam to output plane 46. Additional optical elements such as cylindrical, spherical, or aspherical corrector lenses can be applied at or near the output plane to make the remapped output scene more linear in $\theta$ and to reduce beam spread for the case of input rays with a finite cross-section or divergence.

Some of the practical applications of applicant's invention are usage in an optical matched filter correlator which would make the correlator invariant against rotational and scale changes of the imaged object. Center of vision offsets can be handled by multiple matched filters. Other potential uses include use in real-time image analysis devices such as in neural network visual systems and aimpoint selections. In neural network, the R,$\theta$ mappings are significant to visual systems because they are the natural (i.e. biological) mappings used to provide motor response signals. In aimpoint selections, R,$\theta$ mappings are important because the shape of a R,$\theta$ image around the outer edges of the field of vision i.e. at large R values, is fairly insensitive to small aimpoint variations. Thus, this part of the R,$\theta$ image can be used as an invariant reference to recenter the aimpoint.

Although a particular embodiment and form of this invention has been described and illustrated, it is apparent that various modifications and embodiments of the invention may be made by those skilled in the art without departing from the scope and spirit of the foregoing disclosure. One such modification is to build the transform device of solid transparent material with the various, above-described reflective surfaces embedded therein. Another variation is to make the first and second frustums out of solid, transparent material, carve out cone 2 and airfoil reflector 26 from first frustum 10 and second frustums 18, respectively, to create inner surfaces in the frustums and put reflective coating on the inner surfaces. In this case outer surface 16 of first frustum 10 would be made reflective, also, and second frustum 18 would be a beam splitter. The bases of the two frustums would be joined by means of any standard optical cement.

Accordingly, the scope of the invention should be limited only by the claims appended hereto.

I claim:

1. An all-optical polar transform device, comprising: a 90° cone having a base, an apex and a reflective outer conical surface for reflecting light impinging thereon; a first frustum of a right circular cone said first frustum having a base, a top and a reflective inner conical surface, said inner surface of said first frustum being positioned to receive reflected light from said reflective outer surface of said 90° cone and to reflect said light; an airfoil reflector having a center of curvature, a first teardrop-shaped end, a second teardrop-shaped end and a reflective surface to reflect light impinging thereon, a second frustum of a right circular cone having a base, a top and a beam splitting surface, said second frustum being positioned to receive said light from said reflective inner surface of said first frustum, to reflect said light to said airfoil reflector and to receive reflected light from said airfoil reflector and outcouple said light as useful output.

2. A device as set forth in claim 1, wherein said first frustum encompasses said 90° cone around a common axis.

3. A device as set forth in claim 2, wherein said apex of said 90° cone points toward said top of said first frustum.

4. A device as set forth in claim 3, wherein the diameter of said top of said first frustum is at least as long as the diameter of said base of said right circular cone.

5. A device as set forth in claim 4, wherein said second frustum is geometrically identical to said first frustum.

6. A device as set forth in claim 5, wherein said airfoil reflector is located within said second frustum to receive light from said second frustum and reflect said light in a selected direction.

7. A device as set forth in claim 6, wherein said base of said second frustum is joined to said base of said first frustum.

8. A device as set forth in claim 7, wherein said common axis of said 90° cone passes through said center of curvature of said airfoil reflector.

9. A device as set forth in claim 8, wherein the diameter of said base of said 90° cone is shorter than the diameter of said base of said first frustum.

10. A device as set forth in claim 9, wherein the heights of said 90° cone, first frustum, second frustum and the distance between said first and second teardrop shaped ends of said airfoil reflector are equal.

11. A device as set forth in claim 10, wherein a corrective lens surrounds said second frustum to intercept and adjust the paths of any light passing outwardly through said second frustum.

12. An all-optical polar transform device, comprising: a first thick-walled frustum of a transparent, right circular cone, said first frustum having a base, a top and parallel reflective inner and reflective outer surfaces for reflecting light impinging thereon, said inner surface forming a right circular conical cavity having a base and an apex, a second thick-walled frustum of a transparent, right circular cone, said second frustum having a base, a top, a beam-splitting outer surface, and a totally reflective inner surface, said inner surface forming a cavity extending through said second frustum, said cavity having a center of curvature, axis passing through said center and also having an airfoil shape at planar cross section perpendicular to said axis of said cavity, said second frustum further being positioned to permit said outer surface of said second frustum to receive light from said first frustum and reflect said light toward said inner surface of said second frustum and to receive reflected light from said inner surface and outcouple said light outwardly as useful output.

13. A device as set forth in claim 12, wherein said base of said conical cavity is coplanar with said base of said first frustum.

14. A device as set forth in claim 13, wherein the diameter of said base of said first frustum is longer than the diameter of said base of said conical cavity and longer than the diameter of said top of said first frustum.

15. A device as set forth in claim 14, wherein said second frustum is geometrically identical to said first frustum.

16. A device as set forth in claim 15, wherein said base of said second frustum is joined to said base of said first frustum.

17. A device as set forth in claim 16, wherein the diameter of said base of said conical cavity is equal to the diameter of said top of said first frustum.

18. A device as set forth in claim 17, wherein a corrective lens surrounds said second frustum to intercept and adjust the paths of any light passing outwardly through said second frustum.

19. An all-optical polar transform device, comprising: a right circular cone having a base and a reflective conical surface for reflecting light impinging thereon, a first frustum of a solid transparent right circular cone, said first frustum having a base, a top and a right circular conical cavity in the base thereof, said cavity being positioned along the axis of said first frustum for receiving said right circular cone therein, said first frustum further having a reflective surface for reflecting light impinging thereon from said reflective conical surface of said right circular cone, an airfoil-shaped element having a reflective surface for reflecting light impinging thereon, and a second frustum of a solid transparent right circular cone having a beam splitting surface for receiving light from said first frustum and reflecting said light toward said airfoil-shaped element and receiving reflected light from said airfoil-shaped element and transmitting said light out as useful output, said second frustum further having a base, a top, an axis passing through the center of said base and said top and a cavity extending therethrough, said cavity having a cross section of airfoil at a plane perpendicular to said axis of said second frustum, said cavity further being suitably positioned to receive said airfoil-shaped element therein.

20. A device as set forth in claim 19, wherein a corrective lens surrounds said second frustum to intercept and adjust the paths of any light passing outwardly through said second frustum.

21. A device as set forth in claim 20, wherein said first and second frustums are geometrically identical.

22. A device as set forth in claim 21, wherein said right circular cone and said airfoil reflector fit exactly into said cavities in said first frustum and second frustum, respectively.

23. A device as set forth in claim 22, wherein the diameter of said top of said first frustum is at least as long as the diameter of said base of said right circular cone.

24. A device as set forth in claim 23, wherein said first frustum having said right circular cone inserted therein, said second frustum having said airfoil reflector inserted therein and said corrective lens encompassing said second frustum are suitably joined together to form a single composite device.

25. An all-optical method of translating rectangular coordinates to polar coordinates, comprising the steps of: directing an input beam through an image-containing plane, reflecting said beam from the outer surface of a right circular cone toward a first frustum, reflecting said beam from the inner surface of said first frustum toward a second frustum, reflecting a portion of said beam toward an airfoil reflector, again reflecting said portion back toward second frustum and finally emitting said portion through said second frustum as useful output beam.

26. A method as set forth in claim 25, wherein said reflector has a center of curvature, an axis passing through said center and an airfoil shape at a plane perpendicular to said axis.

27. A method as defined by claim 26, which further comprises the step of passing said output beam through a corrective lens to adjust the paths of said output beam.

* * * * *